United States Patent
Aoki

(10) Patent No.: US 6,919,970 B2
(45) Date of Patent: Jul. 19, 2005

(54) METHOD FOR CALIBRATING COLOR OF AN IMAGE IN TRANSMISSION OF A DIGITAL IMAGE

(75) Inventor: Akira Aoki, Kawasaki (JP)

(73) Assignee: Photographic Art Research Laboratory, Tokyo (JP)

( * ) Notice: Subject to any disclaimer, the term of this patent is extended or adjusted under 35 U.S.C. 154(b) by 790 days.

(21) Appl. No.: 09/749,413

(22) Filed: Dec. 28, 2000

(65) Prior Publication Data

US 2002/0051149 A1 May 2, 2002

(30) Foreign Application Priority Data

Dec. 28, 1999 (JP) .......................................... 11-375423

(51) Int. Cl.⁷ ............................ G06F 15/00; G06K 1/00
(52) U.S. Cl. ...................... 358/1.9; 358/405; 358/2.1; 382/209; 382/214
(58) Field of Search ........................ 358/1.9, 405, 2.1; 382/209, 214

(56) References Cited

U.S. PATENT DOCUMENTS

| | | | |
|---|---|---|---|
| 4,888,636 A | 12/1989 | Abe | ........................... 358/80 |
| 5,142,356 A | 8/1992 | Usami et al. | ................... 358/80 |
| 5,579,031 A | * 11/1996 | Liang | .......................... 345/604 |
| 5,801,853 A | * 9/1998 | Yamada et al. | ............. 358/504 |
| 5,909,291 A | 6/1999 | Myers et al. | ................ 358/523 |

FOREIGN PATENT DOCUMENTS

| | | | |
|---|---|---|---|
| WO | WO 96/00435 | 1/1996 | |
| WO | WO 9600435 A1 * | 1/1996 | ............. G09G/5/02 |

* cited by examiner

Primary Examiner—Kimberly Williams
Assistant Examiner—Michael Burleson
(74) Attorney, Agent, or Firm—Kenyon & Kenyon

(57) ABSTRACT

When transmitting an image between a pair of computer image processing systems A and B, a common color image Z is used as a medium image, the medium image is read as digital data into the computer of the system B from the system A, the color of the digital image displayed on the monitor of the computer of the system B is adjusted to substantially match the color of the common image Z by operating the conventional color adjustment system of the computer, the deviation from the origin (zero point) of the color data displayed on the monitor (brightness, contrast, chroma, and color balance) is found, and, when transmitting any image through the system A to the system B, the color data of the digital image displayed on the monitor of the computer of the system B is corrected using the deviation as the correction value.

8 Claims, 7 Drawing Sheets

(A)

(B)

METHOD FOR CALIBRATING COLOR OF AN IMAGE IN TRANSMISSION OF A DIGITAL IMAGE

BACKGROUND OF THE INVENTION

1. Field of the Invention

The present invention relates to a method for calibrating color of an image, such as a color photograph, in transmission of a digital image between a pair of computer image processing systems A, B.

2. Description of the Related Art

Along with the advances made in computer image processing and the advances made in digital data communications, it has become possible to send digital images from one location to another in a very short time regardless of the distance. In particular, the recent advances in Internet communications have made possible the convenient transmission and reception of digital images. These activities are now entering even our daily lives. Specifically, digital images are being transmitted through Internet communication systems from large numbers of unspecified points of transmission to organizations having specific specialized image processing (including value judging, image correction and processing, and printing) systems and are being processed to order in the specific specialized image processing systems. Further, specialized businesses having a plurality of computer image processing systems are using a combination of these systems for streamlining their work.

Such modern systems for transmission and reception of digital images, however, have only just been put together. The fact is that there are still problems which remain to be solved. One of the problems is the mismatch of the color of the image transmitted between a pair of computer image processing systems (brightness, contrast, chroma, and color balance, hereinafter referred to simply as "color").

In general, to read an image into a computer as digital data, the image is either read through a scanner or the image is captured by a digital camera and that digital data of the image recorded in the camera is read by connecting the camera to the computer. Whatever the case, it is impossible to avoid the reading function of the reading apparatus having an effect on the color of the image. Therefore, it is only natural that the color of the image read by the reading apparatus may not match the color of the digital image displayed on the monitor of the computer. Of course, further reading errors of color data are unavoidable in different reading apparatuses and are unique to each apparatus.

The extent of the color mismatch due to such unavoidable reasons is fixed within each system, so the problem becomes more complex between reading apparatuses in a pair of systems. On top of this, in the case of unspecified large numbers of systems, it may be said with no exaggeration that this problem has to be solved or else no further spread of image transmission systems can be expected.

SUMMARY OF THE INVENTION

To solve the above problem, the invention of the present application has as its object the provision of a rational method of calibration for adjusting the above-mentioned mismatch of color of an image when using a certain pair of computer image processing systems or a plurality of computer image processing systems in combination or between two computer image processing systems through a system for transmission or reception of digital images using a communication system such as an Internet communication system.

To solve this problem, the invention of the present application was developed based on the confirmation by experiment that the problem of mismatch of color of an image when transmitting an image between a pair of computer image processing systems comprised of independent computer image processing systems A and B (hereinafter referred to as simply the systems A and B) is derived from the characteristics of the function of the equipment making up the systems, in particular the image reading equipment, and that the mismatch of color does not substantially change even if the images are different.

That is, from the above discovery, the problem of color in a computer image processing system is solved by the basic technical idea of using an RGB, CMYK, or other reference color image as a medium, transmitting the reference color image to the system B through the computer of the system A, (or vice versa), detecting the reading error of the color of the image (brightness, contrast, chroma, and color balance) at the time of transferring the reference color image, detecting the reading error of the reference color image by the system A as well if necessary, and operating the color adjustment system of the computers of the individual computers to adjust the color of the images displayed on the monitors respectively. Further, as the reference color image, it is also possible to have a pair of systems share a unique color image and to use this as the reference color image.

According to the present invention, even when the images to be transmitted between a pair of directly related computer image processing systems A and B differ, it is possible to transmit from the system A to the system B (or vice versa), a digital image substantially matching in hue with the original image in question through the reference color image.

Furthermore, the present invention has the further advantage that in a case where a new digital image is made by applying a conventional digital image processing technique and thereafter the new digital image is transferred to the system B, a digital image having substantially identical composition and color to the above-mentioned new digital image can be easily displayed on the monitor of the system A, according to the simple method provided by the present invention.

The method for calibrating color of a color image in transmission between a pair of computer image processing systems A and B according to the present invention as mentioned above, comprises a first step of setting a correction value for applying to a color matching operation of either one of the computer image processing systems A and B, and a second step of operation of color matching of a digital image indicated in either one of the systems A and B to a color of an original image before said transmission of the color image, respectively.

For better understanding of the basic technical idea of the present invention, the above-mentioned process is explained in the case of transferring the original image from the system A to the system B as follows:

The first step of setting a correction value is started from an advance preparation of a reference color image as a common standard color image Z for the systems A and B. Then the color image Z is transferred from the system A to the system B and a color matching operation is applied to a transferred digital image which is displayed on the monitor of the system B against the color image Z, so that a difference of color data (brightness, contrast, chroma, and color data) from an origin (zero point) displayed on the monitor of the system B, is detected, and the correction value is set based upon this detected data.

The color matching operation applied to a transmission of any color images from the system A to system B is carried out by the following second step operation, that is, the color matching operation applied to a digital image displayed on the monitor of the system B is carried out by adopting the above-mentioned correcting value.

The basic technical idea of the present invention can be successfully applied to the color matching operation between a digital image indicated in the monitor of the system A and a digital image (corresponding to the above-mentioned digital image) indicated in the monitor of the system B, even though the transmission manner of the digital image is different from the above-mentioned explanation. Such effects of the present invention are hereinafter clarified by the detailed explanation of several embodiments.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Information transmission systems linking a pair of computer image processing systems A and B through a communications line have already been perfected. The ability to precisely transmit digital data through them is a well known fact. Further, it is well known that precise digital data can be transmitted in a similar fashion even when transmitting digital data between the two systems by an MO disc. Therefore, for convenience in explanation, the invention of the present application will be explained with reference to the case of use of an MO disc.

Figure 1:
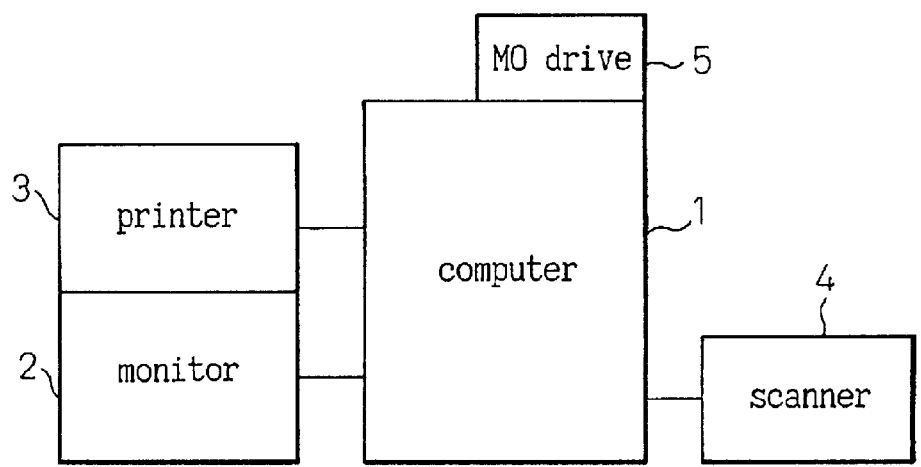
FIG. 1 is an explanatory view of an outline of the arrangement of equipment of computer image processing systems A and B in a typical embodiment of the basic aspect of the invention.
Figure 1:
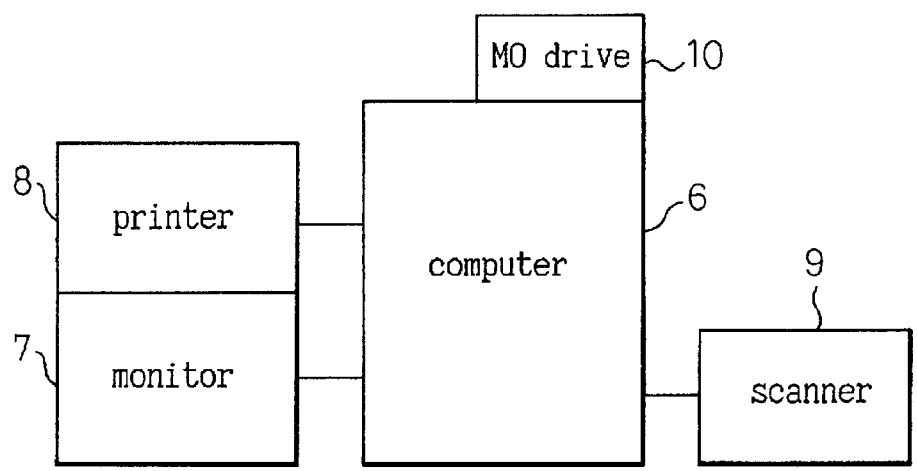

First, an embodiment showing the basic technical idea of the invention of the present application will be explained with reference to FIG. 1. As shown in FIG. 1, the basic invention will be explained with reference to the example of use of a computer image processing system using a Power Macintosh G3 as the computer 1, a Mitsubishi Diamond RD 21G as the monitor 2, an Epson Inkjet Printer 2000C as the printer 3, a Microtek Scan Maker 5 as the scanner 4, and an Olympus Turbo MO 640S as the MO drive 5 (hereinafter referred to as the "system A") and a computer image processing system using a Power Macintosh 9600/300 as the computer 6, a Sony FD Trinitron GPD-G500 as the monitor 7, an Epson Inkjet Printer 2000C as the printer 8, a Microtek Scan Master 4 as the scanner 9, and an Olympus Turbo MO 640S as the MO drive 10 (hereinafter referred to as the "system B") as the pair of computer image processing systems.

As shown in FIG. 1, a known RGB color image (FIG. 3) is prepared as a reference color image and a positive film of a photograph (FIG. 5) of fruit is prepared as the original image for transmission of images from the system A to the system B equipped with the above equipment.

As explained already, in the present invention, it is normal that the preparatory action for setting the calibration value and the color matching operation applied to a digital image displayed on a monitor of either one of the systems A, B are independently carried out. In the Japanese patent application No. PH11-375423, which is the parent patent application from which present patent application claims convention priority, since the first embodiment was carried out with the systems A and B positioned very close together in the inventor's laboratory, the scanning of the original image X was carried out successively to that for the standard color image Z.

To clarify the characteristic feature of the present invention, the first embodiment was carried out in the above-mentioned normal way, and thereby an identical result of the experiment to the first embodiment explained in the Japanese patent application, was obtained.

Figure 2:
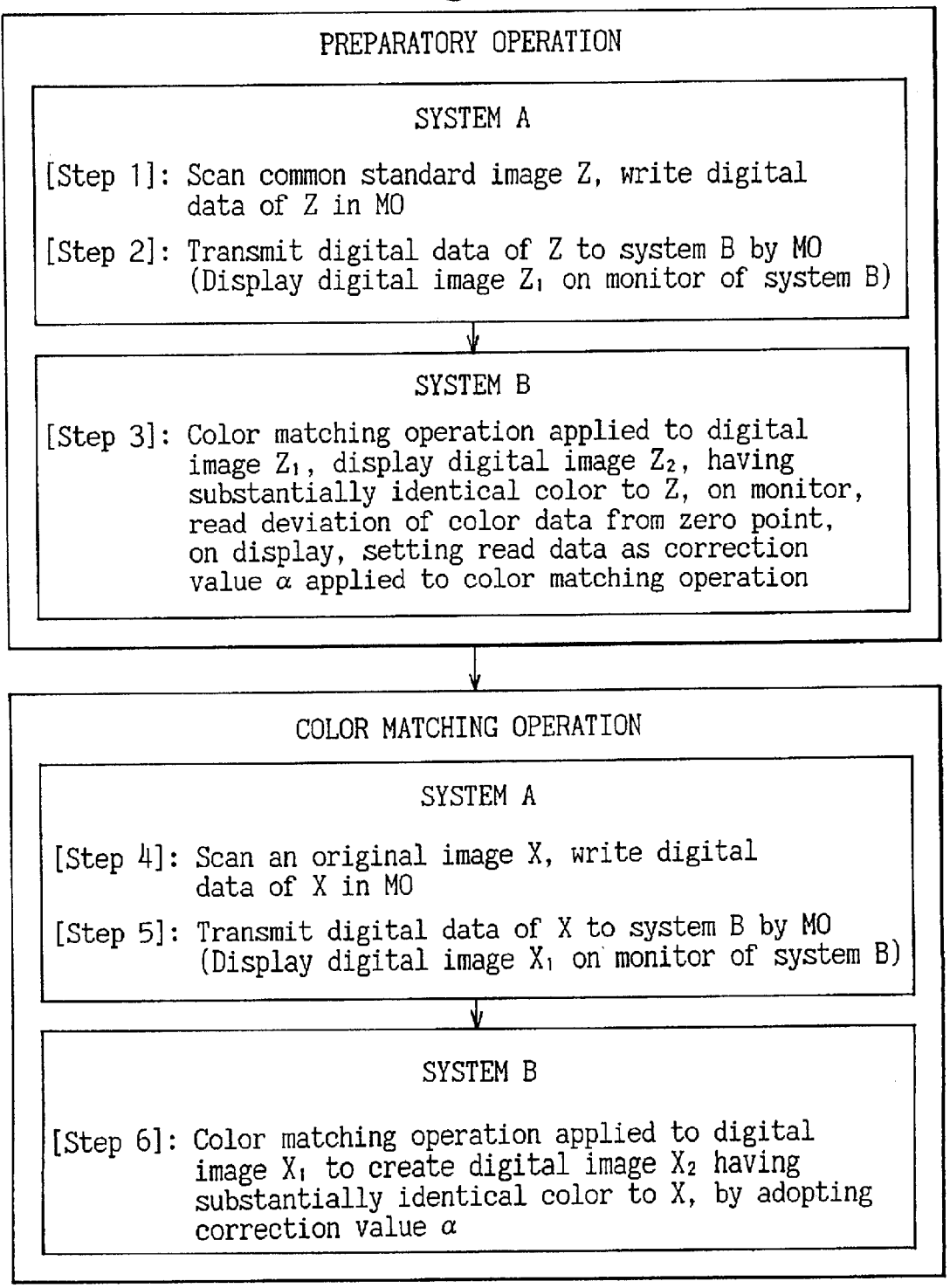
FIG. 2 is a flow chart indicating the action steps of the first embodiment of the present invention.

The first embodiment is hereinafter explained with reference to the flow chart shown in FIG. 2.

Figure 3:
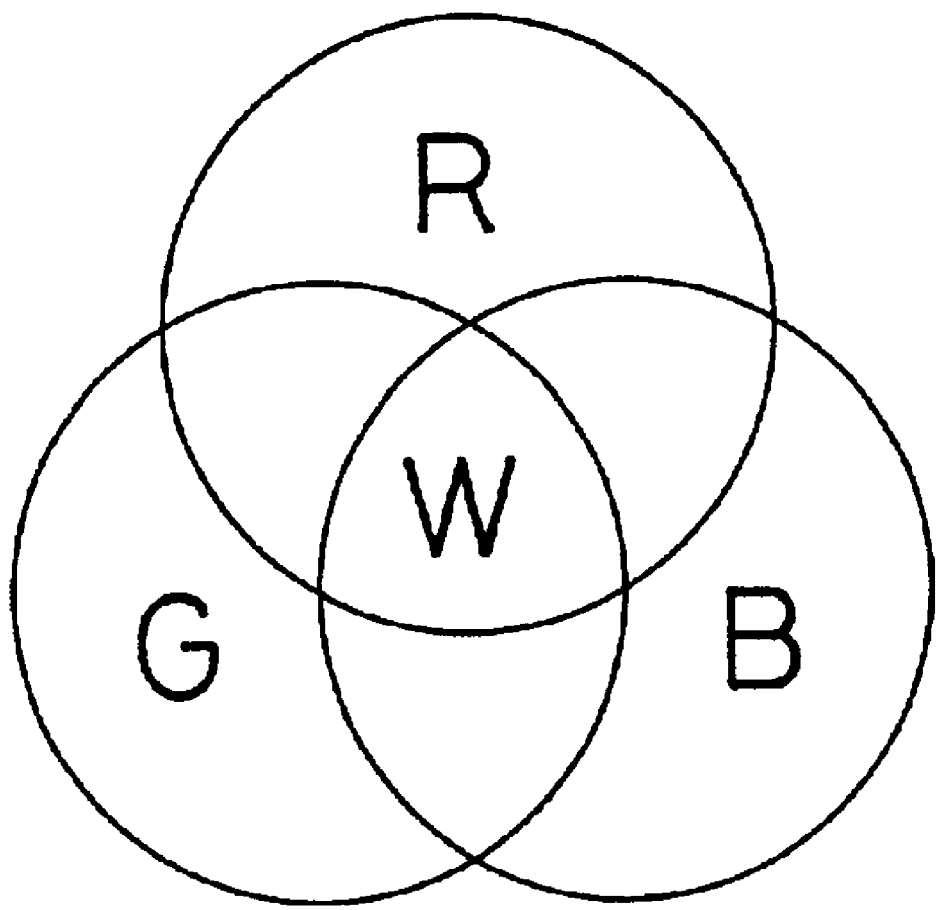
FIG. 3 is a view of an example of a reference color basic image used for correction of the color of an image in transmission of an image shown in FIGS. 1 and 2.

As indicated in this flow chart, as the first action, the standard color image Z (RGB color image) shown in FIG. 3 was scanned by the scanner 4 of the system A, whereby digital data of the color image Z was stored in a memory of the computer 1, then this digital data was written on an MO disc by the MO driver 5 (step 1), and this digital data was transmitted to the system B, where the digital data was stored in a memory of the computer 6 of the system B, and a digital image $Z_1$ was displayed on the monitor 7 of the system B (step 2).

Next, a conventional color matching operation was applied to the digital image $Z_1$ of the system B by adjusting color data (brightness, contrast, chroma, color balance (R, G, B)) displayed on the monitor 7 whereby a digital image $Z_2$ being substantially identical to that of Z was displayed on the monitor 7, and then the deviation of color data from the origin (zero point) was read as the correction value α. This correction value was brightness (−54), contrast (−9), chroma (0), color was (R (−8), G (0), B (−6)) (step 3).

Like the standard color image Z, the original image X was scanned by the scanner 4 of the system A and the digital data of X was stored in the memory of the computer 1 of the system A, then this digital data was written on an MO disc by the MO drive 5 (step 4). Then this digital data was transmitted to the system B by MO, whereby a digital image $X_1$ was displayed on the monitor 7 of the system B (step 5).

Next, the color matching operation is applied to the digital image $X_1$ by adopting the above-mentioned correction value α whereby a digital image $X_2$ being substantially identical to X was displayed on the monitor 7 of the system B.

The second embodiment is an experiment successively applied to the experiment disclosed in the first embodiment, therefore the result of the additional experiment is only disclosed with reference to the flow chart shown in FIG. 4, as follows.

Figure 4:
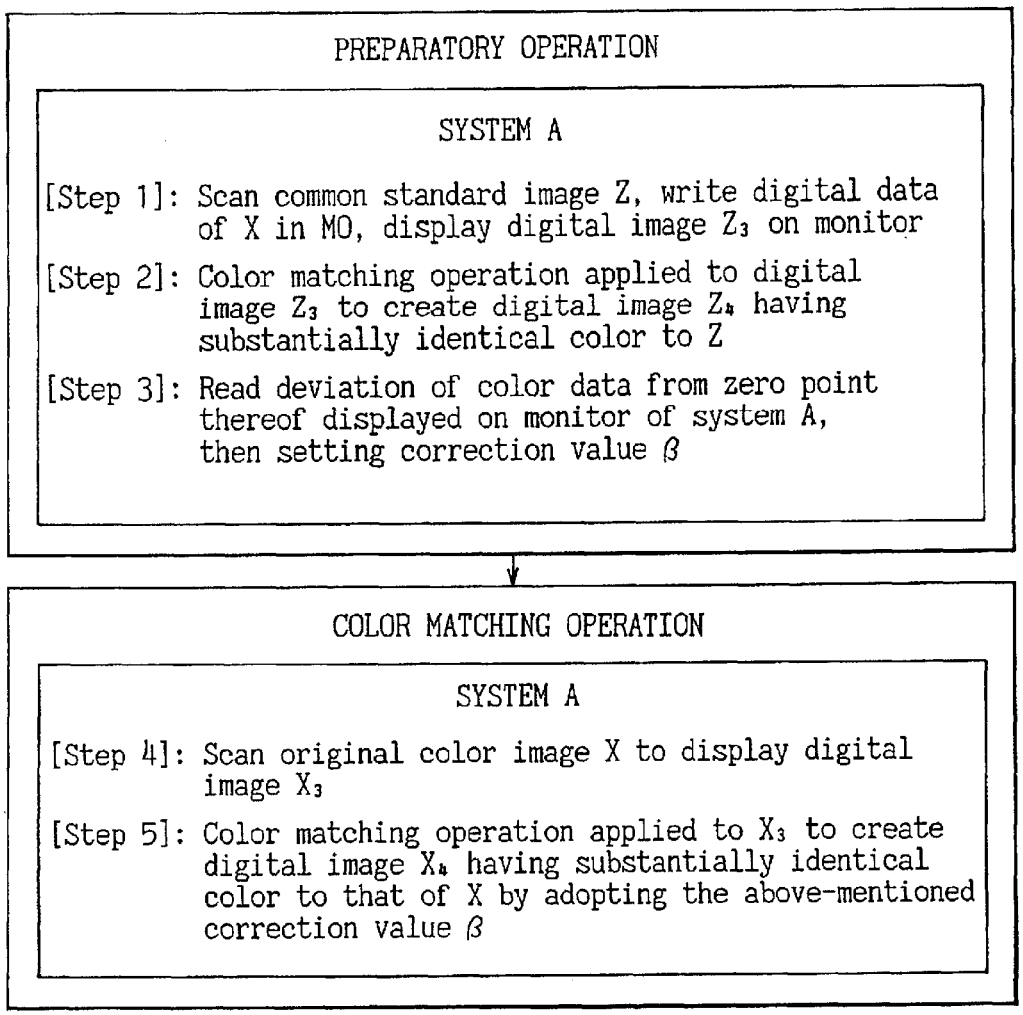
FIG. 4 is a flow chart indicating the action steps of the second embodiment of the present invention.

As shown in the flow chart of FIG. 4, as the additional first step action, the standard color image Z was scanned by the scanner 4 of the system A and the digital data thereof was stored in the memory of the computer 1 and digital image $Z_3$ was displayed on the monitor 2, then as the second additional step, the conventional color matching operation was applied to the digital image $Z_3$ so that a digital image $Z_4$ having substantially identical color to the standard color image $Z_8$ is displayed on the monitor of the system A.

Thereafter, as the third step action, deviation of color data from the origin (zero point) was read, as the step 3 of the first embodiment, and a correction value β which can be applied to the color-matching operation applied to a digital image displayed on the monitor 2 of the system A, which digital image is created by the identical successive operations to the successive operations to display the digital image $Z_3$ on the monitor 2, was settled. This correction value β was brightness (−39), contrast (−3), chroma (0), color balance (R (+1), G (0), B (+1)).

After the above-mentioned preparatory operation, as the fourth step, the printed picture of fruits (original image) X was scanned by the scanner 4 of the system A and the digital image $X_3$ was displayed on the monitor 2 of the system A. Then the color matching operation was applied to the digital image $X_3$ by adopting the above-mentioned correction value β so that a modified digital image $X_4$, having substantially identical color to the original image, was displayed on the monitor 2.

The third embodiment of the present invention comprises the contents of the second embodiment mentioned above and additional action steps of transmitting the digital image $X_4$ to the system B whereby a digital image $X_5$ corresponding to the digital image $X_4$ is displayed on the monitor 7 of the system B, and color matching operation applied to the digital image $X_5$ whereby a modified image $X_6$ being substantially identical to the digital image X is displayed on the monitor 7 of the system B.

Figure 5:
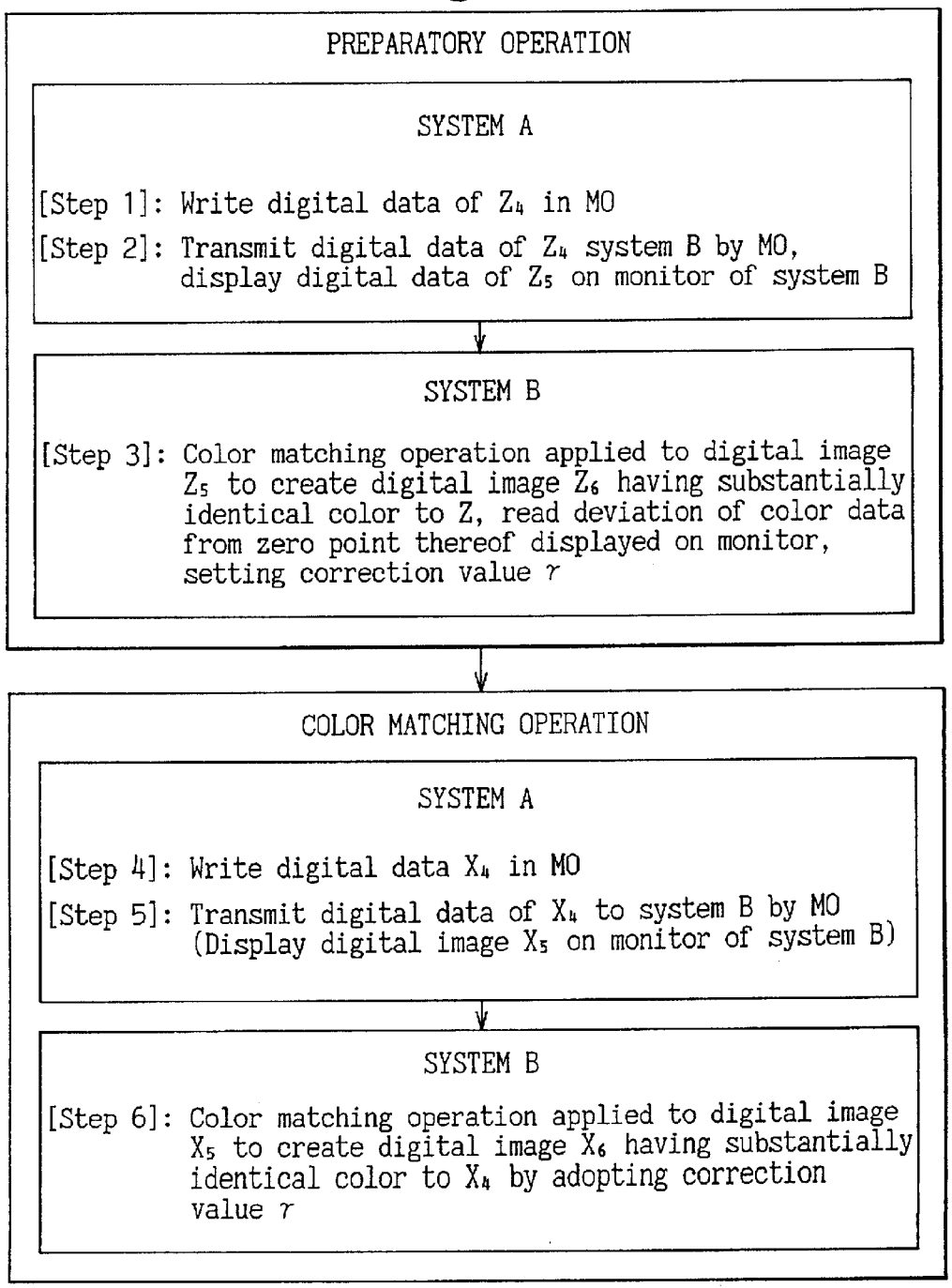
FIG. 5 is a flow chart indicating the action steps of the third embodiment of the present invention.
Figure 6:
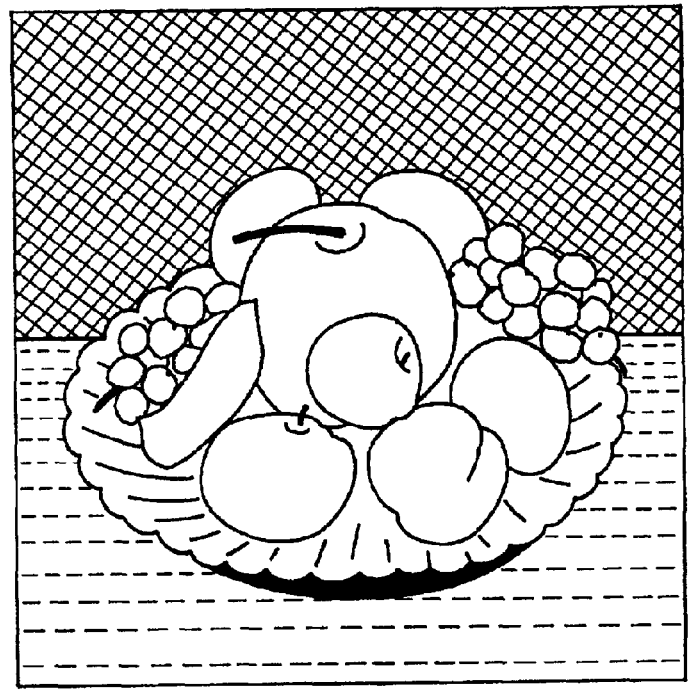
FIG. 6 is a view of the image (line drawing) of an original photograph of a combination of fruit.
Figure 7:
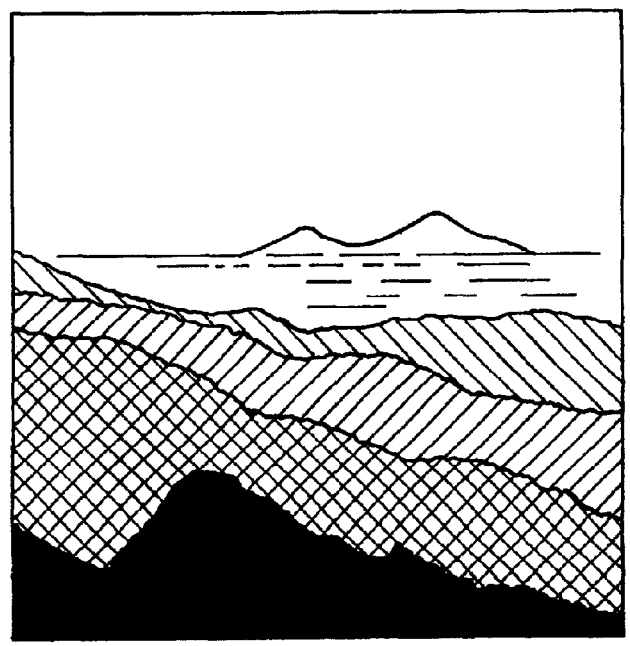
FIG. 7 is a view of the image (line drawing) of an original photograph of Mt. Bandai.

As is clear from the flow chart shown in FIG. 5, it is necessary to find a correction value γ for the color matching operation applied to the digital image $X_5$ displayed on the monitor 7 of the system B whereby a modified digital $X_6$ is displayed on the monitor 7 of the system B.

The first action of this embodiment is written the digital data of the digital image $Z_4$ on an MO disc by the MO drive 5 of the system A (step 1) and the transmission of the digital data of the digital image $Z_4$ to the system B whereby a digital image $Z_5$ is displayed on the monitor of the system B (step 2).

Then the conventional color matching operation is applied to the digital image $Z_5$ whereby a digital image $Z_6$ having substantially identical color to that of Z is displayed on the monitor 7 of the system B, and the data deviation from the origin of color data displayed on the monitor 7 was read as the correction value γ.

This correction value γ was brightness (−15), contrast (−6), chroma (0), color balance (R (−7), G (0), B (−5)) (step 3).

As the next operation (step 4), the digital data of the image $X_4$ was written on an MO disc by the MO drive 5 of the system A, and then this digital data was transmitted to the system B by this MO, whereby a digital image $X_5$ was displayed on the monitor 7 of the system B (step 5).

As the action of step 5, the color matching operation was applied to the digital image $X_5$ by adopting the correction value γ whereby a modified digital image $X_6$ being substantially identical to the color of the image $X_4$ was displayed on the monitor 7 of the system B.

From the result obtained by the third embodiment in relationship to the results of the first and second embodiments, the following very important knowledge was found regarding the relationship between the correction values α, β and γ, defined by the equation (α−β≈γ).

Due to the results of the above-mentioned experiments of the first, second and third embodiments, a very interesting technical idea was found that correction values α', β', γ' being identical to −α, −β, −γ can be adopted as the correction values applied to a color matching operation in the case of digital-image-transmission when the direction of transmission is reverse to the direction of transmission of a digital image in the above-mentioned embodiments. The above-mentioned relationship of the correction values was confirmed by repeated tests.

It is common business sense that working efficiency should be as high as possible. From this viewpoint, the idea of adopting a so-called "action program" to operate the color matching operation explained by the above-mentioned embodiments, was conceived.

The following fourth embodiment disclosed the color matching operation carried out by the action program based upon the correction value explained in the first embodiment.

The method for calibrating color of a digital image disclosed by this embodiment is characterized by the application of an action program to perform the color matching operation, without manually adjusting respective color data such as brightness, contrast, chroma, color balance (R, G, B) indicated on the display of the computer 7 of the system B.

The application of an action program to modify a digital image indicated on the display of a computer is well known in the art by, for example, the operation manual of "Adobe Photoshop 5.5 J", and very effective power of the application of such an action program to carry out the computer image processing has been recognised in accordance with the progress of digital data processing technology. From this viewpoint, the fourth embodiment can be understood as a demonstration the power of an action program applied to the first embodiment. Therefore the fourth embodiment is simply explained by describing the action steps which are different from those of the first embodiment, as follows.

The same actions as the first, second and third actions of the first embodiment were carried out at first, so that the above-mentioned correction value α (brightness (−54), contrast (−9), chroma (0), color balance (R (−8), G (0), B (−6))) was settled. Then, as a fourth step action, the action program was made by adopting the above-mentioned known technology. Since the technical information regarding this action program is disclosed in detail in the above mentioned operation manual, the explanation of this action in the action program is omitted.

In the condition that the action program titled "Action program 1" is installed in the memory of the computer 6 of the system B, the fifth step is carried out as follows. As disclosed in the explanation of the first embodiment, the digital data of X is transmitted to the system B by the step action 2 so that the digital image $X_1$ is displayed on the monitor 7 of the system B. The computer 6 is then operated to apply the above-mentioned action program titled "Action program 1" to modify the color of the digital image $X_1$, and as a result of this calibration action, a digital image $X_2$ having a color substantially identical to that of the color of the original image X (printed picture of Mt. Bandai in this case) was indicated on the display 7 of the system B.

Since it is clear from the result of the fourth embodiment that the working efficiency of the color matching operation is much higher than that of the manual color matching operation disclosed by the first embodiment wherein matching of each color data such as brightness, contrast, chroma, and color balance is successively carried out manually. Therefore, a very effective result of this type of color matching operation can be expected in the case of a continuous business relationship of digital image transmission between the system A and system B. And it is further noted that a so-called batch operation can be successfully apply to a group of plural digital images transmitted from the system A.

The next embodiment concerns an application of the present invention related to a network system in the business of photography formed by a main shop (hereinafter referred as the system B), having sufficient power of carrying out the computer image processing process, and at least one subsidiary shop (hereinafter referred to as the system A) without such power as the system B.

Figure 8:
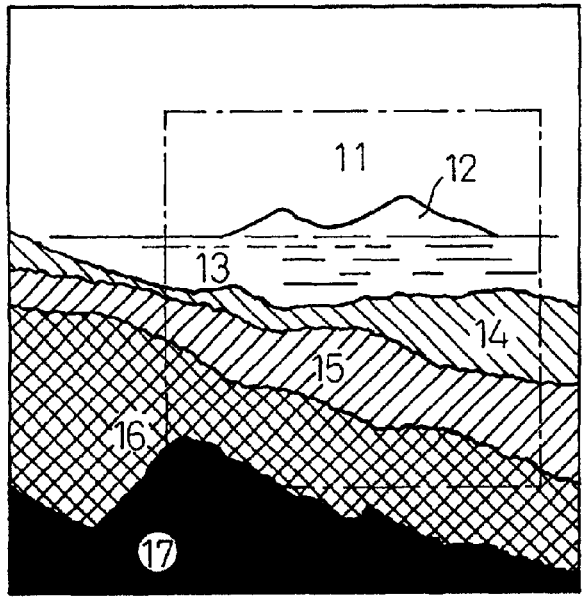
FIG. 8 is a view of the image of the original photograph of Mt. Bandai, indicating instructions for trimming.
Figure 9:
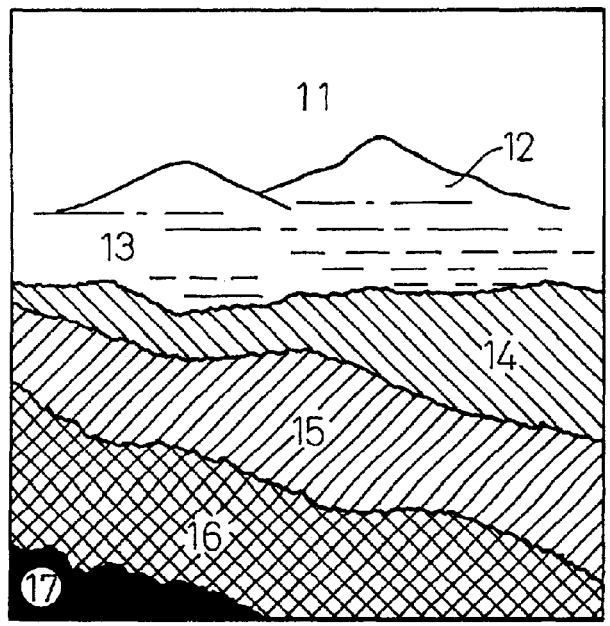
FIG. 9 is a view of the expected image of Mt. Bandai indicating desired color balance between components of picture.

In this embodiment, the experiment was planned to carried out as follows: that is, the system A receives an order from a customer M to make an enlarged printed picture of Mt. Bandai from an original printed picture X with reference to the customer's instruction note. Then, the system A scans this printed picture X by their computer system and the scanned digital data is transmitted to the system B together with the digital data of the instruction note, wherein the color image P (FIG. 8) indicating a trimming instruction and the color image Q (FIG. 9) indicating the desired color of the respective elements of the color image P are included. Then, the system A scans this printed picture X and the instruction note, whereby scanned digital data is transmitted to the system B so that the digital image $X_1$ and other digital images $P_1$ and $Q_1$ are indicated on the display 7 of the system B, then a color matching operation is applied to these digital images so that modified digital images $X_2$, $P_2$ and $Q_2$, being substantially identical to the respective original color images X, P and Q, are indicated on the display 7.

Thereafter, this digital image $X_2$ is processed with reference to the contents of the instruction indicated on display of this system B. This process is carried out by using a known technique to change the composition by trimming and adjusting the color balance (brightness, contrast, chroma, and color balance) of the components of the digital image $X_7$. As a result of such processing, a final image $X_7$ is created on the monitor 7.

The next step action is the preparatory action applied to the digital image $X_7$ before transmitting the image to the system A. It was recognized from the experiments of the above-mentioned embodiments that the correction value Σ applied to the color-matching operation applied to the case of transmission from the system B to the system A is identical to (−γ) wherein γ is the correction value applied to the case of transmitting a digital image from the system A to the system B, to satisfy the condition of color matching the corresponding digital images displayed on the respective monitors of these systems A and B. Therefore the color modification is applied to the digital image $X_7$ by adopting the correction value δ, that is a correction value (brightness (+15), contrast (+6), chroma (0), color balance (R (+7), G (0), B (+5)), whereby a color-modified digital image $X_8$ can be displayed on the monitor 7 of the system B. Thereafter, the digital image $X_8$ is transmitted to the system A by an MO disc. Accordingly, a digital image $X_9$ having identical composition and color to the digital image $X_7$ can be displayed on the monitor 2 of the system A.

The first action of the experiment of the fifth embodiment was started based upon the instruction note. Thereafter, the printed picture X of Mt. Bandai and the instruction note were scanned by the scanner 2 of the system A, then the scanned digital data of these materials were transmitted to the system B by MO disc whereby a digital image $X_1$ and a digital image of the instruction note were displayed on the display 7 of the system B.

Next, the color matching operation was applied to the digital images $X_1$ and $Q_1$ by adopting a correction value being identical to the correction value α selected in the experiment of the first embodiment, whereby a digital image $X_2$ having substantially identical color to the original picture X was displayed on the monitor 7 of the system B, while the digital image $Q_2$ indicating color balance of the background sky (11), top portion of Mt. Bandai (12), thin cloud portion (13) and mountain range (14, 15, 16 and 17) was also clearly displayed on the monitor 7.

The third step action was applied to create a new digital image $X_7$ based upon the instruction indicated in the digital image of the above-mentioned reference note. That is, digital data processing was carried out by operating the computer 6 of the system B based upon the reference note (digital image $P_1$) so that digital image $X_7$ was displayed on the monitor 7 of the system B.

The fourth step action, which is the preparatory action applied to the digital image $X_7$ before transmission to the system A, was carried out by adopting the correction value −γ mentioned above, that is, a color modification operation was applied to the digital image $X_7$ by adopting the above-mentioned correction value −γ whereby a color-modified digital image $X_8$ was displayed on the monitor 7 of the system B. Thereafter, the digital image $X_8$ was transmitted from the system B to the system A by MO disc, and as the result of this transmission of the digital image $X_8$, a digital image $X_9$ being identical in composition and color to the digital image $X_7$ was displayed on the monitor 2 of the system A.

As already explained in the introduction part of the present specification, the color mismatch problem in the digital image transmission between the system A and system B is mainly caused by the characteristics of the function of the equipments making up these systems. Therefore, the correction value for adopting the color matching operation according to the present invention could be constant, unless the basic function of the equipment is changed. However, in the present invention, since the color matching operation for finding a correction value is carried out on the basis of manual observation, it is impossible to prevent deviation of observed color data, even if such a deviation is small. The influence of the environment during the color matching observation to find a correction value must also be considered. Accordingly, the following method to raise the level of accuracy of the correction value is recommended. (1) The environment during the process to find a correction value is desired to maintained in a highly constant condition. (2) The correction value should be settled several times and an average of the correction values should be set as a standard correction value. If such an action is carried out by several persons, a more reliable result can be expected.

According to the experience of the applicant, it is also helpful to increase the accuracy of the correction value by the result of the color matching operation applied to several cases of digital transmission between two systems located in an identical working place.

Effect of the Invention

As explained above, the previously unavoidable problem of mismatch between the color (brightness, contrast, chroma, and color balance) of images in transmission of images between a pair of computer image processing systems can be eliminated by an extremely simple operation. Therefore, in the case of maintaining a continuous business relation between the system A and the system B, once the above-mentioned correction value is settled for applying the color matching operation, the color matching operation can be carried out very effectively, until the basic condition that can be affect the correction value is changed. Due to such an advantage attained by the present invention, it is expected to contribute a great deal to business engaged in image processing by a plurality of computer image processing systems and to development of image processing by specialized business using communication by, for example, the Internet.

While the invention has been described by reference to specific embodiments chosen for purposes of illustration, it should be apparent that numerous modifications could be made thereto by those skilled in the art without departing from the basic concept and scope of the invention.

What is claimed is:

1. A method for calibrating color of an image which is transmitted from a computer image processing system A to a computer image processing system B, by transmitting a digital image in the form of scanned data based upon on an original color image directly either unmodified or after applying a color matching operation to said digital image in which operation the color of said scanned image is modified to be substantially identical to said original color image, comprising:

a preparatory operation for selecting a correction value for use in applying a color matching operation before or after transmission of said scanned data, based upon a common standard color image, and a final color matching operation applied to said digital image to create a condition of substantial coincidence of a color thereof when displayed on a monitor of said system B, with a color of said original color image, by application of said correction value obtained by said preparatory operation, said preparatory operation, comprising:

displaying a digital image corresponding one of said systems A and B, thereafter an initial color matching operation being applied to said digital image to create a modified digital image having substantially identical color to said common standard color image, and reading respective correction data indicated on said monitor, whereby said read correction data is determined to be said correction value.

2. A method for calibrating color of an image in transmission from a computer image processing system A to a computer image processing system B according to claim 1, wherein said preparatory operation for selecting a correction value comprises:

scanning a printed common standard color image Z by said system A and transferring digital data of said scanned standard color image indicated on a monitor of said system A to said second system B whereby a color image $Z_1$ is indicated on the monitor of the system B, applying said initial color matching operation to said color image $Z_1$ based upon said printed common standard color image Z whereby a modified color image $Z_2$ having substantially identical color to that of said printed common standard color image Z is created, and reading a deviation of color data from the original image (zero point) as a correction value α for applying the final color matching operation in transferring of printed color images from said system A to said system B, said final color matching operation applied to said digital image, comprising:

carrying out said final color matching operation of said digital image by applying said selected correction value α, whereby a modified color image being substantially identical to the color of said original printed color image is displayed on the monitor of said second system B.

3. A method for calibrating color of an image in transmission from a computer image processing system A to a computer image processing system B according to claim 1, wherein said preparatory operation for selecting a correction value comprises:

scanning a printed common standard color image Z in said system A, whereby a digital image $Z_3$ is displayed on a monitor of said system A, applying a first initial color matching operation to said color image $Z_3$ based upon said printed common standard color image Z whereby a modified color image $Z_4$ being substantially identical in color to said printed common standard color image Z indicated on a monitor of said system A, and thereafter the deviation of color data from the original image (zero point) being read as a correction value β, transferring said modified color image to said system B whereby a digital image $Z_5$ is displayed on the monitor of said system B, and applying a second initial color matching operation to said color image $Z_5$ based upon said printed common standard color image Z whereby a modified color image $Z_6$ being substantially identical in color to said printed common standard color image Z is displayed on the monitor of system B, and thereafter the deviation of color data from the original image (zero point) being read as a correction value γ, said final color matching operation applied to said digital image transferred from said system A to said system B in a similar manner to the transfer of said printed standard color image to obtain the correction values β and γ, comprising:

scanning an original printed color image by said system A whereby a digital image is displayed on the monitor of said system A, applying a first final color matching operation to said digital image by applying said correction value β whereby a digital image being substantially identical to the color said original color image is displayed on the monitor of said system A transferring said modified color image displayed on said monitor of system A to said system B whereby a digital image is displayed on the monitor of said system B, and applying a second final color matching operation to said digital image displayed on the monitor of said system B by applying said correction value γ whereby a modified color image being substantially identical to said original printed color image is displayed on the monitor of said system B.

4. A method for calibrating color of an image in transmission from a computer image processing system A to a computer image processing system B according to claim 1, claim 2 or claim 3, wherein said printed common standard color image is an RGB common standard color image.

5. A method for calibrating color of an image in transmission from a computer image processing system A to a computer image processing B according to claim 3, comprising:

transferring a color digital image displayed on a monitor of said system A to said second system B whereby a color digital image is displayed on the monitor of said system B, and applying a further color matching operation to said color digital image displayed on the monitor of said system B by applying said selected correction value γ whereby a modified color image being substantially identical to said color digital image indicated on the monitor of said system A is indicated on the monitor of said system B.

6. A method for calibrating color of an image in transmission from a computer image processing system A to a computer image processing system B according to claim 3, comprising:

scanning a printed color image by said system A, whereby a digital image is displayed on the monitor of said system A, and applying a further color matching operation to said digital image by applying said selected correction value β, whereby a modified color image being substantially identical to the color of said printed color image is displayed on said monitor of said system A.

7. A method for calibrating color of an image in transmission from a computer image processing System A to a computer image processing system B according to claim 2, further comprising, creating a new color image on the monitor of system B from said modified color image created by the final color matching operation based upon correction value α, applying a further color modification operation applied to said new color image by applying a correction value −γ whereby a color modified new image is displayed on said monitor of system B, transmitting said color modified new image from system B to system A, whereby a color image having identical color and components to said new color image is displayed on said monitor of system A.

8. A method for calibrating color of an image in transmission from a computer image processing system A to a computer image processing system B according to claim 2, wherein an action program for carrying out said color matching operation based upon said correction value α is stored in said system B, said color matching operation being successively applied to a group of digital images transferred from said system A to said system B based upon said action program, whereby very effective color matching operations are carried out on the group of digital images transferred from said system A to said system B.

* * * * *